US006804779B1

United States Patent
Carroni et al.

(10) Patent No.: US 6,804,779 B1
(45) Date of Patent: Oct. 12, 2004

(54) HIERARCHICAL WATERMARKING OF CONTENT THAT IS DISTRIBUTED VIA A NETWORK

(75) Inventors: Germano Carroni, Sunnyvale, CA (US); Amit Gupta, Fremont, CA (US); Radia Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,742

(22) Filed: Jan. 10, 2000

(51) Int. Cl.[7] .................................................. G06F 1/24

(52) U.S. Cl. ........................ 713/176; 713/150; 713/163

(58) Field of Search .............................. 713/176, 150, 713/163, 168, 180

(56) References Cited

U.S. PATENT DOCUMENTS 6,122,403 A * 9/2000 Rhoads ....................... 382/233

OTHER PUBLICATIONS

Brown, I. et al., "Watercasting: Distributed watermarking of multicast media," Proceedings of the First International Workshop on Networked Group Communicators, Pisa, Nov. 1999.
Caronni, G. "Assuring ownership rights for digital images," Proceedings of Reliable IT Systems, pp. 1–10 (1995).
Lin, C.-Y. et al., "Multimedia authentication," (1999) <http://www.ctr.columbia.edu./~cylin/auth/mmauth.html.

* cited by examiner

Primary Examiner—Thomas R. Peeso
(74) Attorney, Agent, or Firm—Lahive & Cockfield, LLP

(57) ABSTRACT

Content is distributed via a network. Hierarchical watermarks are embedded in the content to prevent unauthorized copying of the content. In particular, a first digital watermark is embedded by a content source prior to distributing content to an intermediary distributor. The first watermark identifies the content source and the distributor. Clients that request copies of the content from the distributor receive copies that have a second digital watermark embedded. The second digital watermark identifies the distributor and the client. This approach alleviates the burden placed on the content source to embed watermarks to each copy of the content that is distributed to clients.

35 Claims, 5 Drawing Sheets

HIERARCHICAL WATERMARKING OF CONTENT THAT IS DISTRIBUTED VIA A NETWORK

TECHNICAL FIELD

The present invention relates generally to computer systems and more particularly to the hierarchical watermarking of content that is distributed via a network.

BACKGROUND OF THE INVENTION

A traditional watermark is a translucent design that is impressed on paper during manufacture of the paper. The traditional watermark is only visible when the paper is held to a light source. Digital watermarks have been developed as the digital equivalents of conventional watermarks. Digital watermarks are embedded in digital content, such as images or documents. Digital watermarks are created by modifying the bits within the digital content to embed codes without significantly modifying the content in which the watermarks are embedded.

Digital watermarks are available in two varieties: visible or invisible. Visible watermarks correspond with the traditional watermarks found on paper. Visible watermarks are usually used to make clear the origin or data but are rarely used to identify the destination of data. Invisible watermarks are invisible to anyone other than the original distributor of the image. Invisible watermarks should be hard to detect so as to allow the distributor to securely identify a recipient of content. Invisible watermarks should be configured so that they survive printing and scanning.

Parties have proposed the use of digital watermarks to protect the dissemination of copyrighted content on the Internet. In particular, when a copy of content is to be distributed, a digital watermark is first embedded in the content. If the party that receives the copy of the content subsequently makes illicit (i.e. unauthorized) copies of the content, the watermark is embedded in the subsequently generated copies. As such, there is proof that the party that received the content is the one that generated the illicit copies. Copyrighted content such as images, text, computer programs and other types of content may have digital watermarks embedded in them.

The above-described conventional approach of embedding digital watermarks to content may prove cumbersome for content that is in high demand. Each time that a party wishes to send a copy of the content to a requester, the party must generate a new digital watermark and embed the digital watermark in the copy of the content that is to be distributed to the requester. When thousands of requesters seek copies of the content, the generation and embedding of the watermarks may prove quite a burden. Such situations may arise, for example, with content such as images, web pages, documents, computer programs or even text that is distributed over the Internet.

SUMMARY OF THE INVENTION

The present invention provides an approach to hierarchical watermarking. The watermarking is hierarchical in that each level in a hierarchy of distributors distribute its own watermark in the content before passing the content on in the hierarchy. The content source may embed a digital watermark in content before the content is passed to a distributor. The digital watermark may identify the content source and the distributor via information embedded in the digital watermark. This first digital watermark discourages the distributor from generating illicit (i.e. unauthorized copies) of the content. The distributor then embeds a second digital watermark in the content whenever a client seeks a copy of the content. The second digital watermark contains information identifying the client. The second digital watermark provides protection against the client generating illicit copies of the content. The burden of creating the second digital watermark is not placed on the content source but rather is placed upon an intermediary (i.e. the distributor).

In accordance with one aspect of the present invention, a method is practiced in a system that has a content source for distributing a copy of content to a content consumer. An intermediary is provided between the content source and the content consumer. The intermediary embeds a second digital watermark in the content. A first digital watermark is already embedded in the content. The digital watermarks are not visible to parties other than the respective parties that embedded the digital watermarks. Thus, the intermediary can detect the digital watermark it embedded, and the content source can see the digital watermark that the content source embedded. The content is forwarded with the first and second digital watermarks to the content consumer from the intermediary. The content may take many forms including image data, text, audio data and computer program instructions.

In accordance with another aspect of the present invention, a method securely distributes content over a computer network. The content source is provided for furnishing content and a first digital watermark is embedded in the content at the content source. A copy of the content with a first digital watermark is forwarded from the content source to a proxy for distribution. When a customer requests a copy of the content, a second digital watermark is embedded in the content and the content with the first digital watermark and the second digital watermark is forwarded to the customer. The proxy may be but is not limited to, for example, a file transfer protocol (FTP) server, a mail server or a web server that distributes web pages.

In accordance with an additional aspect of the present invention, information is received at a distributor for distributing content from a content source to a customer. The information concerns a secret known to the content source and identification of the distributor. The information is used to generate a digital watermark at the distributor and the digital watermark is embedded in the content at the distributor. The content has another digital watermark embedded in it.

In accordance with a further aspect of the present invention, a method is practiced in a system having a content source for providing content and multiple content distributors for distributing the content to customers. For each of the distributors, a secret is identified. The secret is known to the content source and a value is calculated from the secret and from information identifying the distributor. The calculated value is forwarded to the distributor for use in embedding a digital watermark in content at the distributor.

In accordance with another aspect of the present invention, a computer system includes an interface with a content source for receiving content from the content source. The computer system also includes a digital watermark facility for embedding a digital watermark in the content that is received from the content source. The content contains another digital watermark embedded in it by the content source. The computer system additionally includes an interface with a client for forwarding the content with the digital watermarks to the client.

BRIEF DESCRIPTION OF THE DRAWINGS

An illustrative embodiment that is consistent with the principles of the present invention will be described below relative to the following drawings.

DETAILED DESCRIPTION OF THE INVENTION

The illustrative embodiment provides an approach to embedding hierarchical watermarks in content that is distributed over a network. Each level of a distribution hierarchy may embed its own watermark in the content and then forward the content on in the hierarchy. As the watermarks are largely invisible and resistant to modification, each watermark does not get greatly disturbed by embedding other watermarks. In the illustrative embodiment a content source forwards a copy of content to an intermediary distributor for subsequent distribution to clients. If the distributor distributes illicit copies, the content source can trace and prove misbehavior by the distributor. The content source is, thus, more comfortable in offloading the work of distributing copies of the content to the intermediary distributor. The distributor embeds digital watermarks to the copies of the content that are distributed to the clients to ensure that illicit copies of the content are traceable. The illustrative embodiment is especially well-adapted for distribution of content over a computer network, such as the Internet.

For the purposes of the discussion below, it is helpful to define a few terms.

A "digital watermark" is an encoding of information within digital data of a piece of content. In the illustrative embodiment, the digital watermark may encode information regarding the party to which the content is being distributed.

An "intermediary" refers to an entity, such as a server/computer system, that acts as a go-between with a content source and clients that request a copy of content from the content source. "Intermediary" will be used interchangeably with "distributor" hereinafter.

A "content source" is any computer system, device or other resource that is able to provide content that is distributable to clients.

A "client" is an entity, such as a person, computer system or device, that requests content from a content source. In the illustrative embodiment, a client is a content consumer.

Figure 1:
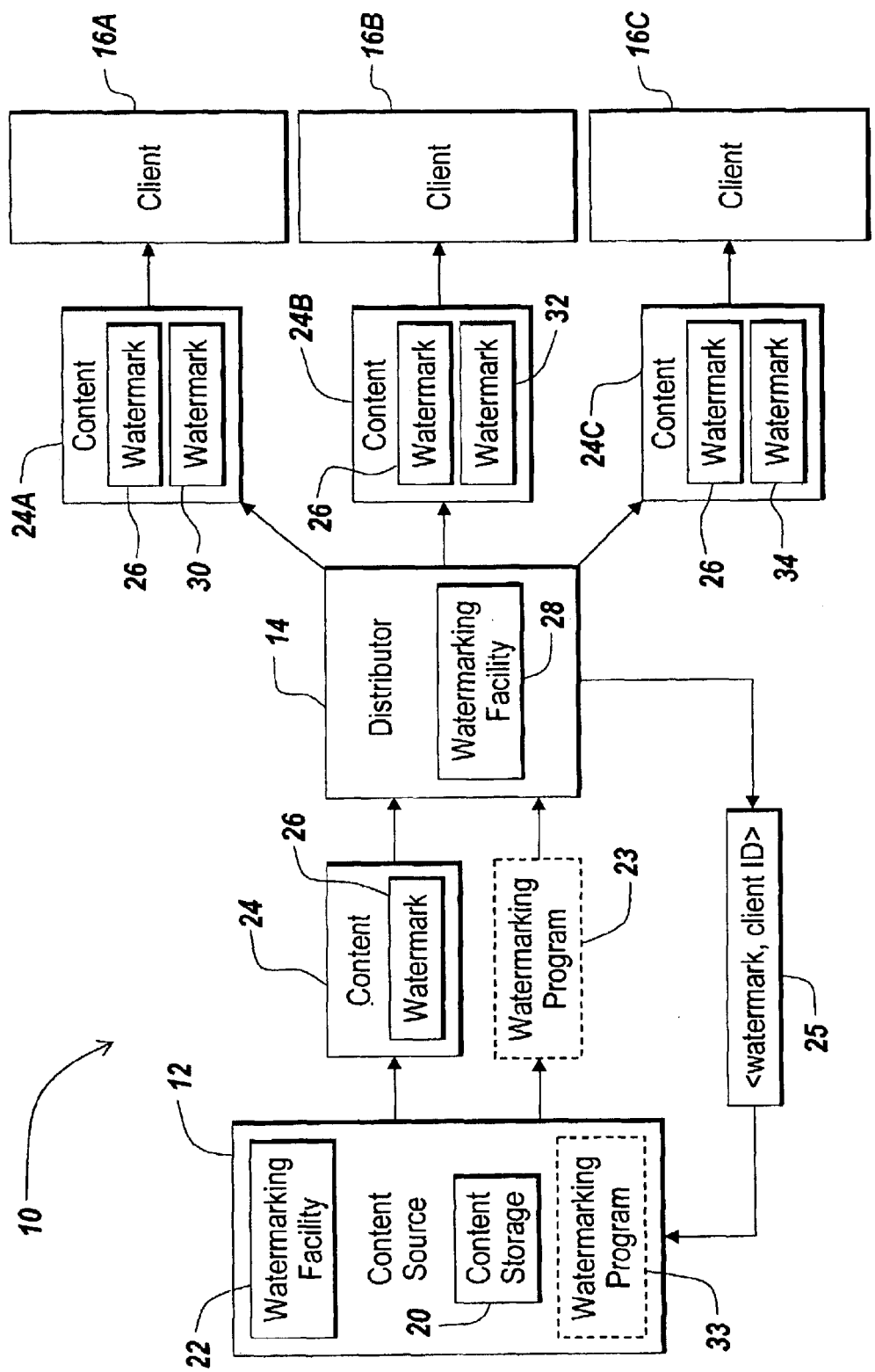
FIG. 1 is a block diagram of an environment 10 that is suitable for practicing the illustrative embodiment where a content source embeds a first digital watermark in content before passing the content to a distributor.

FIG. 1 shows an environment 10 that is suitable for practicing the illustrative embodiment. A content source 12 includes a content storage that holds content for distribution to clients 16A, 16B and 16C. The content storage 20 may be realized as, for example but not limited to, computer memory (including both primary storage and/or secondary storage) a set-top box, or an information appliance. More generally, the content source is any device that is capable of providing content. The content storage 20 may include computer-readable media and a number of different types of memory technologies, including, but not limited to random access memory (RAM), read only memory (ROM), erasable programmable read only memory (EPROM), flash memory, electrically erasable programmable read only memory (EEPROM), magnetic disk storage, optical disk storage or other types of memory.

Figure 2:
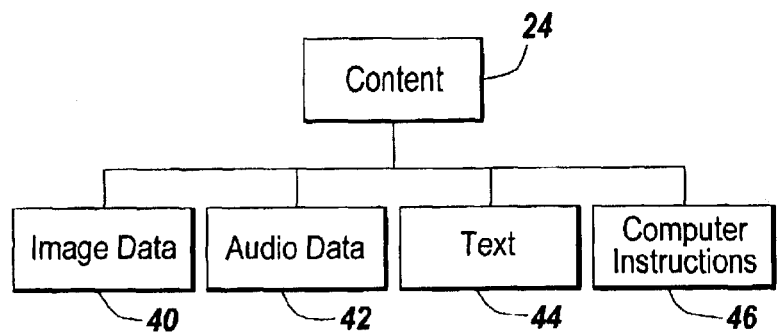
FIG. 2 illustrates various options for the content 24 of FIG. 1.

The content stored within the content storage 20 at the content source 12 may take any of a number of different forms including those depicted in FIG. 2. For example, the content 24 may hold image data 40 or audio data 42. In some instances, the content 24 may include both image data 40 and audio data 42. The content 24 may also include text 44 or computer instructions 46, such as instructions found in an applet computer program or other executable content. The content may include web pages or content to be incorporated into web pages, in some instances.

The environment 10 includes a distributor 14 for receiving content 24 from the content source 12 and distributing copies 24A, 24B and 24C of the content to respective clients 16A, 16B and 16C. The distributor 14 may take many different forms, including but not limited to the forms of an ftp server, a mail server, a web server or a content distributor. The distributor 14 may include a watermarking facility 28 for embedding a digital watermark in copies of the content that are distributed to the client 16A, 16B and 16C. In some embodiments, the clients 16A, 16B and 16C must tender payment to receive a copy of the content. The proceeds of the payment may be shared by the content source 12 and the distributor 14.

Figure 3:
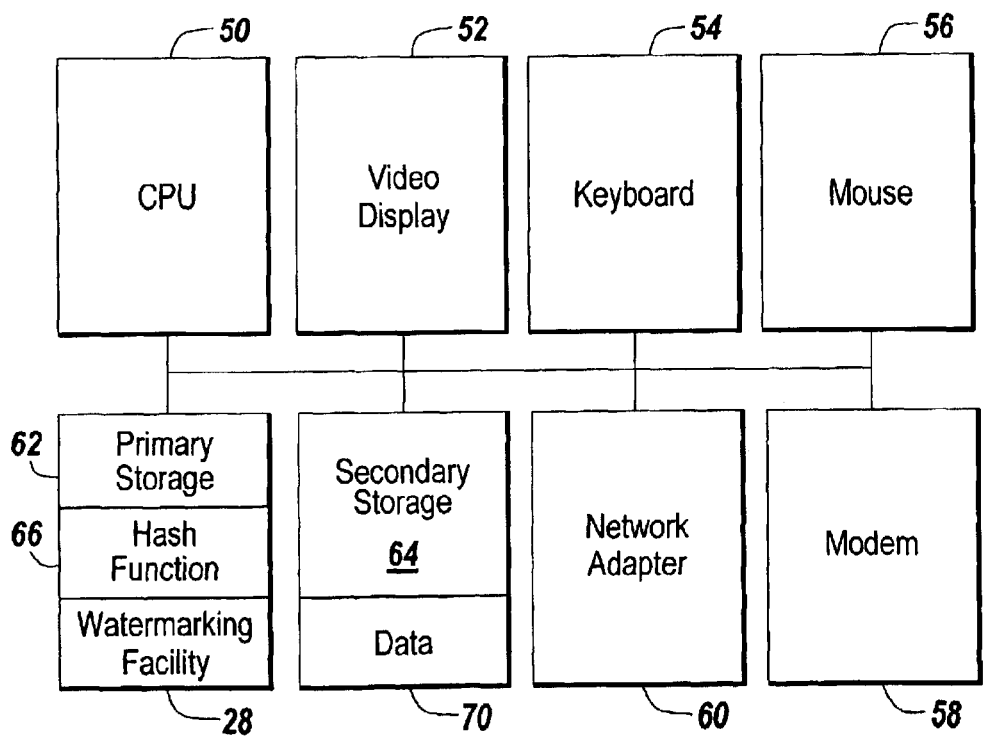
FIG. 3 is a block diagram illustrating components of the distributor 14 in more detail.

The distributor 14 may take many forms. For example, the distributor 14 may be a computer system like that depicted in FIG. 3. The computer system includes a central processing unit (CPU) 50 that has a number of input/output devices, including a video display 52, a keyboard 54 and a mouse 56. The distributor 14 may include a modem 58 for communicating with remote computing resources. The modem 58 may be a cable modem, a wireless modem or a conventional modem for use with analog telephone lines. The distributor 14 may include a network adapter 60 for interfacing the distributor with a local area network (LAN). The distributor 14 may include a primary storage 62 and secondary storage 64. The secondary storage 64 may hold data 70 that is used when performing operations, as will be described in more detail below. The primary storage 62 may hold a copy of the watermarking facility 28 and code for calculating a hash function 66. A watermarking facility 28 may be realized in software, firmware or even hardware. For purposes of the discussion below, it is presumed that the watermarking facility 28 is implemented in software by one or more programs.

Those skilled in the art will appreciate that the distributor 14 need not be realized as a computer system but rather may be realized as another type of intelligent device, such as a digital switch or other intelligent device within a telephone network. The distributor 14 may be realized as a server computer system, such as a web server, an FTP server, or a mail server, for distributing content to the client 16A, 16B and 16C.

The clients 16A, 16B and 16C are content consumers. The clients 16A, 16B and 16C may be computer systems, such as personal computers, network computers, palmtop computers, personal digital assistants (PDAs) or the like. Alternatively, the clients 16A, 16B and 16C may be intelligent appliances, such as television sets, audio systems, MP3 devices or other varieties of electronic devices that are capable of consuming content. Each of the clients 16A, 16B and 16C may be a different variety of devices.

Figure 4:
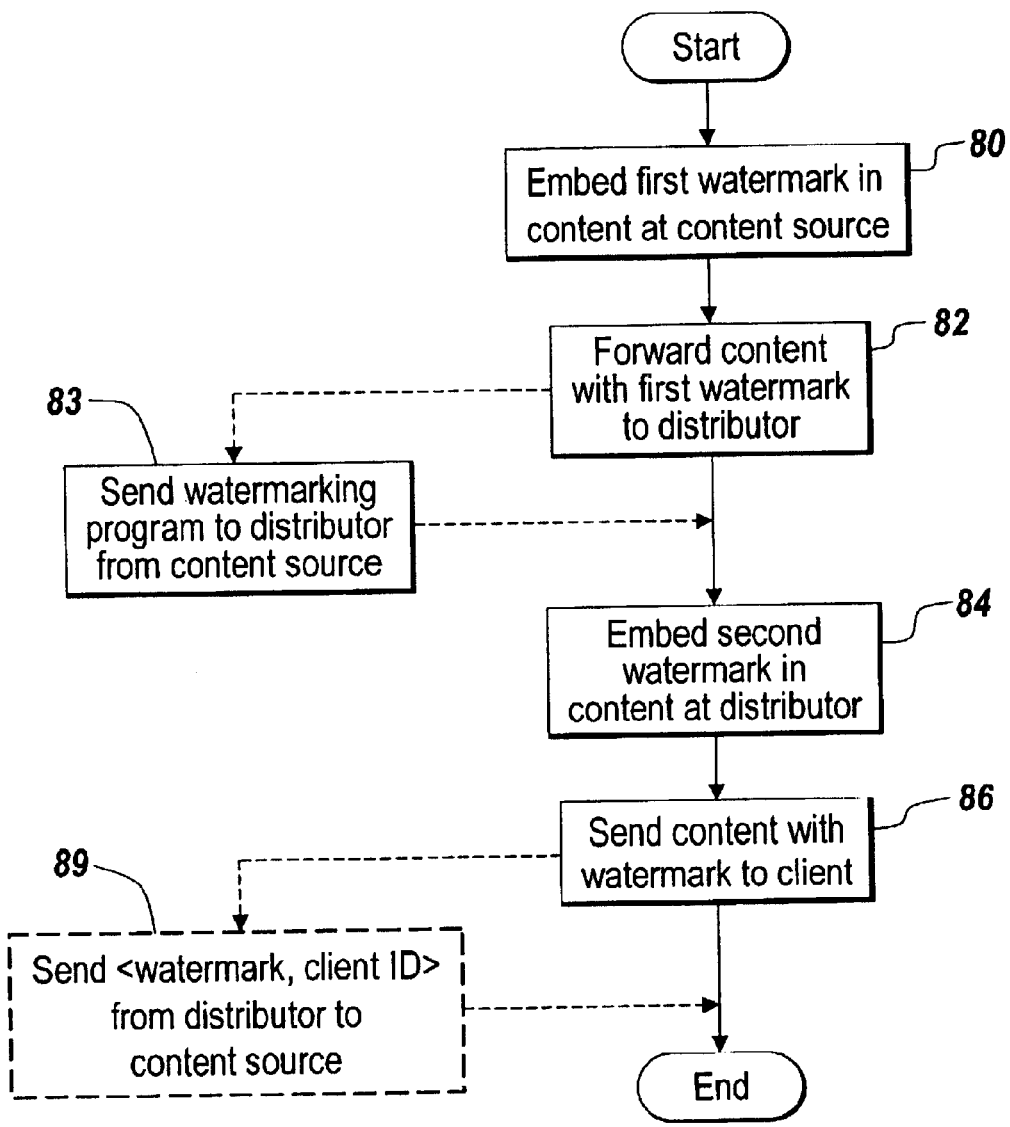
FIG. 4 is a flow chart illustrating the steps that are performed in the illustrative embodiment when the content source attaches a first digital watermark to content.

FIG. 4 provides a flow chart of the steps that are performed for the scenario depicted in FIG. 1. The content source 12 desires to forward content 24 from the content storage 20 to the distributor 14. Thus, the content source 12 embeds a first digital watermark 26 in the content 24 using the watermarking facility 22 (step 80 in FIG. 4). A suitable watermarking algorithm is described in Germano Caronni, Assuring Ownership Rights for Digital Images, in H. H. Brueggemann and W. Gerhardt-Haeckl, ed. *Proceedings of Reliable IT Systems, VIS '95*, Germany 1995. Those skilled in the art will appreciate that other watermarking algorithms may be used in practicing the present invention. The content 24 with the first digital watermark 26 is then forwarded to the distributor 14 (step 82 in FIG. 4). The two watermarks 26 and 30 form a "hierarchy" of watermarks. For the case depicted in FIG. 1, the distributor 14 receives a request from the client 16A to obtain a copy of the content 24. The distributor 14, in response, embeds a second digital watermark using the watermarking facility 28 (step 84 in FIG. 4). Thus, the copy 24A of the content that is forwarded from the distributor 14 to the client 16A includes the first watermark 26 and the second watermark 30 (step 86 in FIG. 4). The distributor 14 may send a watermark/client ID pair for the second watermark to the content source (step 89 in FIG. 4). This enables the content source to know which watermarks are sent to the clients 16A, 16B and 16C. Alternatively, the distributor 14 may keep this information secret in some instances or merely store the information to alleviate storage requirements on the content source.

In some instances, the content source 12 may contain a watermarking program 23 that identifies how to embed the second watermark. The watermarking program 23 may contain information that is particular to the content 24 (i.e. specific to the data set). This watermarking program 23 is optionally sent to the distributor 14 for use in creating and embedding a second watermark in a copy of the content (step 85 in FIG. 4).

In the illustrative embodiment, the content source 12 knows which watermark 26 was embedded in the content 24 when the content was forwarded to the distributor 14. Any illicit unauthorized copies of the content 24 generated by the distributor 14 will include this watermark. In a similar fashion, the distributor 14 maintains information regarding which second watermarks are sent with content to the respective clients 16A, 16B and 16C. Any illicit copies generated by the clients 16A, 16B and 16C will contain not only the first watermark but also the second watermark. As such, the piracy is traceable to identify the client.

The distributor 14 may distribute copies of the content to multiple clients 16A, 16B and 16C or even a single client. Preferably, the distributor 14 is in close proximity to the clients to provide quicker service than if the copies of the content were distributed directly from the content source 12. Each copy of the content includes a distinct watermark that is particular to the client to which the copy is sent. Thus, in FIG. 1, copy 24B of the content includes watermark 26 and watermark 32, which is particular to client 16B. Similarly, copy 24C of the content includes watermark 34, which is particular to client 16C.

Figure 5:
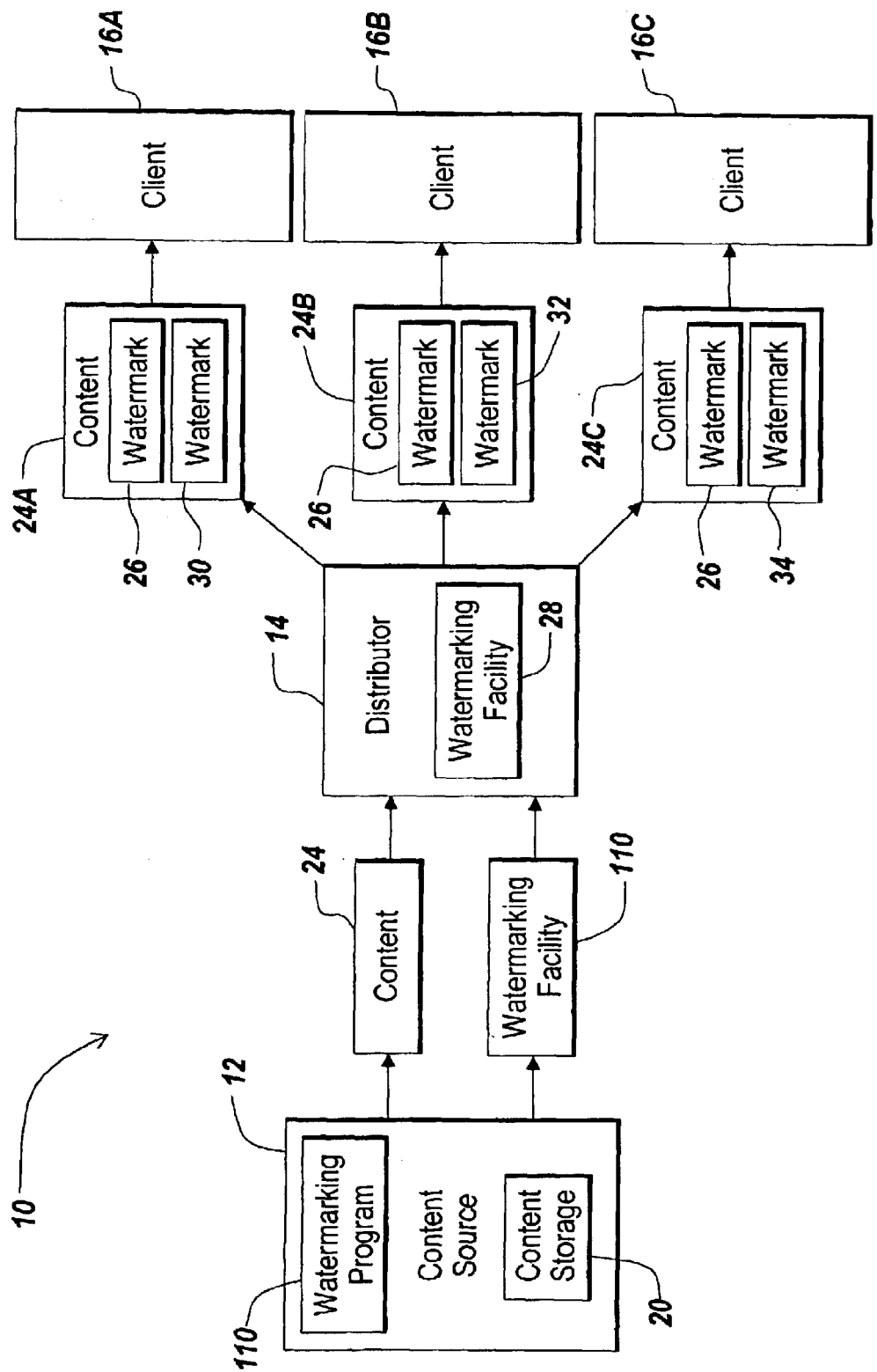
FIG. 5 illustrates an environment that is suitable for practicing the illustrative embodiment wherein the content source provides a watermarking program to the distributor to guide the distributor in embedding digital watermarks in the content.

FIG. 5 depicts another alternative that is similar to that depicted in FIG. 1. In this instance, the content source 12 still distributes the content 24 to the distributor 14 without a first digital watermark 26. However, the content source 12 distributes a watermarking program 110 to the distributor 14 to guide the distributor 14 on how to generate the first digital watermark and second digital watermark (step 102 in FIG. 5). Steps 104 and 106 are performed, as described above.

Figure 6:
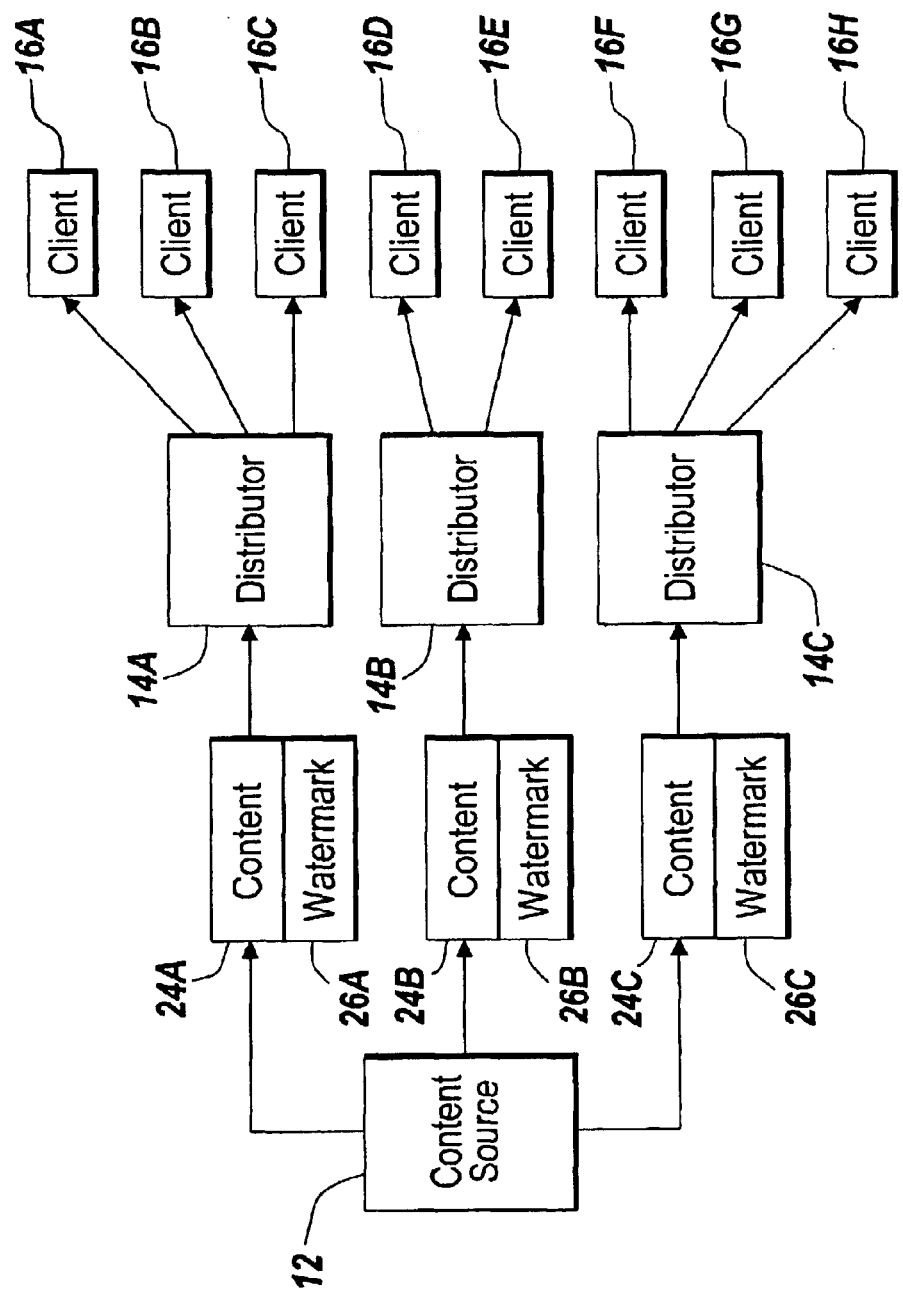
FIG. 6 depicts an instance wherein a content source distributes copies of content to multiple distributors.

A single content source 12 may distribute copies of content to multiple distributors. For example, as shown in FIG. 6, content source 12 distributes a first copy 24A of content to distributor 14A, a second copy 24B of the content to distributor 14B and a third copy 24C of the content to distributor 14C. Each of the copies 24A, 24B and 24C of the content includes a respective first digital watermark 26A, 26B and 26C that is unique to the respective distributor 14A, 14B and 14C. Each of the distributors 14A, 14B and 14C may then distribute the content with the second watermarks to the client that the distributor services. In the example depicted in FIG. 9, distributor 14A services client 16A, 16B and 16C. Distributor 14B services client 16D and 16E, and distributor 14C services client 16F, 16G and 16H.

The content source 12 may provide client IDs for the client 16A, 16B and 16C to the distributor 14. The distributor 14 may use these client IDs in creating the digital watermarks, as will be described in more detail below. Alternatively, the distributor 14 may be responsible for assigning client IDs to the clients 16A, 16B and 16C.

The second digital watermark that is applied to a copy of content (i.e. 30, 32 and 34 in FIG. 1) may be derived in a number of different fashions. In a first alternative, a random number is formed by taking a hash of a shared secret known to the content source 12 (and the distributor) and the client ID. A suitable hash algorithm is the MD5 hash algorithm. The resulting random number is used to seed a pseudo random number generator. The output of the pseudo random number generator identifies which digital watermark is to be embedded in the content. Should an illicit copy of the content be made with a digital watermark embedded that was calculated in this fashion, one can trace the copy of the content to the distribution.

For an environment, like that depicted in FIG. 6, where there are multiple distributors, a second alternative watermarking approach may be used to derive the digital watermarks. The distributors 14A, 14B and 14C may be owned by a common entity, such as an internet service provider (ISP). In the second alternative, a random number may be calculated by taking a hash value of a secret known to the content source and the name of the distributor. The resulting random value is used as a seed to a pseudo-random number generator. The output from the pseudo random number generator determines the digital watermark that is applied by the distributor 14A, 14B, 14C.

The illustrative embodiment benefits the content source 12 in that the content source is not overloaded by having to embed watermarks in each copy of the content requested by a client. The distributor 14 is benefited because the distributor does not need to fetch the content from a content source again and again in response to client requests. Vastly, the clients 16A, 16B and 16C benefit in that they receive the content more quickly than if the clients were to obtain the copies from the remote content source 12.

While the present invention has been described with reference to an illustrative embodiment thereof, those skilled in the art will appreciate that various changes in form and detail may be made without departing from the intended scope of the present invention as defined in the appended claims.

What is claimed is:

1. In a system having a content source for distributing a copy of content to a content consumer, a method, comprising the steps of:
   providing an intermediary between the content source and the content consumer;
   embedding a second digital watermark in the content, which already has a first digital watermark embedded, at the intermediary; and
   forwarding the content with the first digital watermark and the second digital watermark embedded to the content consumer from the intermediary.

2. The method of claim 1 further comprising embedding the first digital watermark in the content at the content source.

3. The method of claim 1 further comprising informing the content source that the second watermark has been embedded in the content that has been forwarded to the content consumer.

4. The method of claim 1 further comprising forwarding a watermarking program from the content source to the intermediary for embedding the second digital watermark to the content at the intermediary.

5. In a system having a content source for distributing a copy of content to a first and second content consumer, a method, comprising the steps of:
   providing an intermediary between the content source and the first and second content consumer;
   embedding a second digital watermark in the content, which already has a first digital watermark embedded, at the intermediary;
   forwarding the content with the first digital watermark and the second digital watermark embedded to the first content consumer from the intermediary; and
   embedding an additional digital watermark that differs from the second digital watermark in the content which already has the first digital watermark embedded but does not have the second watermark embedded and forwarding the content with the first watermark embedded and the additional watermark embedded to the second content consumer.

6. The method of claim 5 wherein the content comprises image data.

7. The method of claim 5 wherein the content comprises text.

8. The method of claim 5 wherein the content comprises audio data.

9. The method of claim 5, wherein the content comprises video data.

10. The method of claim 5, wherein the content comprises executable content containing instructions that are executable by the content consumer.

11. A method of securely distributing content over a computer network, comprising:
    providing a content source for the content;
    embedding a first digital watermark in the content at the content source;
    forwarding a copy of the content with the first digital watermark to a proxy from the content source for distribution; and
    when a customer requests a copy of the content, embedding a second digital watermark in the content and forwarding the content with the first digital watermark and the second digital watermark embedded in the customer.

12. The method of claim 11 wherein copies of the content are forwarded to multiple customers.

13. The method of claim 12 wherein for each customer to which a copy of the content is forwarded, a unique second digital watermark is embedded in the copy of content before the copy is forwarded.

14. The method of claim 11 wherein the computer network is the Internet.

15. The method of claim 11 wherein the proxy is a mail server for forwarding electronic mail.

16. The method of claim 11 wherein the proxy is an FTP server and the content is a document.

17. The method of claim 11 further comprising calculating the second digital watermark from information regarding the content source and information regarding the customer.

18. The method of claim 17 wherein the calculating of the second digital watermark entails calculating a hash function value.

19. In a system having a content source for providing content and a distributor for distributing the content to a customer, a method, comprising:
    receiving information at the distributor regarding a secret known to the content source and information containing identification of the distributor;
    using the information to generate a digital watermark at the distributor; and
    attaching the digital watermark to the content at the distributor, wherein the content has another digital watermark attached to it.

20. The method of claim 19 further comprising forwarding the content with the digital watermarks attached from the distributor to the customer.

21. The method of claim 19 wherein using the information step comprises calculating a hash function value from the information that is received.

22. In a system having a content source for providing content and multiple content distributors for distributing the content to customers, a method, comprising:
    for each of the distributors,
    (i) identifying a secret for the distributor, said secret being known to the content source;
    (ii) calculating a value from the secret and from information identifying the distributor; and
    (iii) forwarding the value to the distributor for use in attaching a digital watermark to the content at the distributor.

23. The method of claim 22 wherein the calculating of the value comprises calculating a hash function value by applying a hash function to the secret and the information identifying the distributor.

24. The method of claim 22 wherein the content comprises image data.

25. The method of claim 22 wherein the content comprises audio data.

26. The method of claim 22 wherein the content comprises text.

27. The method of claim 22 wherein the content comprises computer program instructions.

28. The method of claim 22, wherein the content comprises video data.

29. The method of claim 22 wherein the method further comprises instructing the distributor where to apply the digital watermark to the content.

30. The method of claim 22 wherein the distributor is instructed to apply the digital watermark to a portion of the content where no other digital watermark is applied.

31. An apparatus for acting as an intermediary for assisting in distribution of content from a content source to a content consumer, comprising:

means for attaching a second digital watermark to the content, which already has a first digital watery attached, at the intermediary;

means for forwarding the content with the first digital watermark and the second digital watermark to the content consumer from the intermediary; and means for informing the content source that the second watermark has been attached to the content that has been forwarded to the content consumer.

32. A computer system for receiving content from a content source and distributing the content to at least one client, comprising:

an interface with the content source for receiving content from the content source;

a digital watermark facility for attaching a digital watermark to the content received from the content source, wherein the content containing another digital watermark that has been attached by the content source; and an interface with the client for forwarding the content with the digital watermarks to the client.

33. A medium for use in a system that has a content source for distributing a copy of content to a content consumer by way of an intermediary, said medium holding instructions for execution by the intermediary to perform a method, comprising the steps of:

attaching a second digital watermark to the content, which already has a first digital watermark attached, at the intermediary; and forwarding the content with the first digital watermark and the second digital watermark to the content consumer from the intermediary.

34. A medium for use in a system having a content source for providing content and a distributor for distributing the content to a customer, said medium holding instructions for performing a method, comprising:

receiving information at the distributor regarding a secret known to the content source and information containing identification of the distributor;

using the information to generate a digital watermark at the distributor;

attaching the digital watermark to the content at the distributor, wherein the content has another digital watermark attached to it; and forwarding the content with the digital watermarks attached from the distributor to the customer.

35. A medium for use in a system having a content source for providing content and multiple content distributors for distributing content to customers, said medium holding instructions for performing a method, comprising:

for each of the distributors,
  (i) identifying a secret for the distributor, said secret being known to the content source;
  (ii) calculating a hash function value by applying a hash function to the secret and the information identifying the distributor; and
  (iii) forwarding the value to the distributor for use in attaching a digital watermark to the content at the distributor.

* * * * *